United States Patent
Ward et al.

(10) Patent No.: US 6,944,863 B1
(45) Date of Patent: Sep. 13, 2005

(54) QUEUE BANK REPOSITORY AND METHOD FOR SHARING LIMITED QUEUE BANKS IN MEMORY

(75) Inventors: Wayne D. Ward, New Brighton, MN (US); David R. Johnson, Oakdale, MN (US); David C. Johnson, Roseville, MN (US); Charles R. Caldarale, Minneapolis, MN (US)

(73) Assignee: Unisys Corporation, Blue Bell, PA (US)

( * ) Notice: Subject to any disclaimer, the term of this patent is extended or adjusted under 35 U.S.C. 154(b) by 705 days.

(21) Appl. No.: 09/747,036

(22) Filed: Dec. 21, 2000

(51) Int. Cl.[7] .......................................... G06F 15/163
(52) U.S. Cl. ....................................................... 719/310
(58) Field of Search ........................... 719/310; 709/310

(56) References Cited

U.S. PATENT DOCUMENTS

| | | | |
|---|---|---|---|
| 5,488,359 A | * | 1/1996 | Faris et al. |
| 5,524,227 A | * | 6/1996 | Cuthbertson et al. |
| 5,602,998 A | | 2/1997 | Alferness et al. |
| 5,944,788 A | * | 8/1999 | Krantz et al. ............... 345/783 |
| 6,029,205 A | | 2/2000 | Alferness et al. ........... 709/300 |
| 6,032,267 A | * | 2/2000 | Fishler et al. .................. 714/11 |
| 6,247,064 B1 | | 6/2001 | Alferness et al. |
| 6,308,219 B1 | * | 10/2001 | Hughes ....................... 345/764 |
| 6,381,686 B1 | * | 4/2002 | Imamura ..................... 711/203 |
| 6,466,575 B1 | * | 10/2002 | Ahn ............................. 715/502 |
| 6,675,278 B1 | * | 1/2004 | Chowdhary et al. ........ 711/203 |

OTHER PUBLICATIONS

Jitsupou, Extended Memory Address Control System, Mar. 16, 1989.*

* cited by examiner

Primary Examiner—Meng-Al T. An
Assistant Examiner—LeChi Truong
(74) Attorney, Agent, or Firm—Michael B. Atlass; Mark T. Starr

(57) ABSTRACT

In a computer system a system of exchanging tokens for queue banks is created that permits a requester to directly specify which queue bank is wanted. Only the desired queue bank is withdrawn from a queue bank repository to accomplish this and no sorting or FIFO handling of queue banks is needed. The system uses a schema similar to a coat check room, where the requester is given a token when the requestor wants to deposit a queue bank into the queue bank repository. The queue bank repository returns the queue bank when the token is returned by the requester. In its most efficient form, two machine-level instructions handle the entire operation, a withdraw instruction and a deposit instruction.

9 Claims, 9 Drawing Sheets

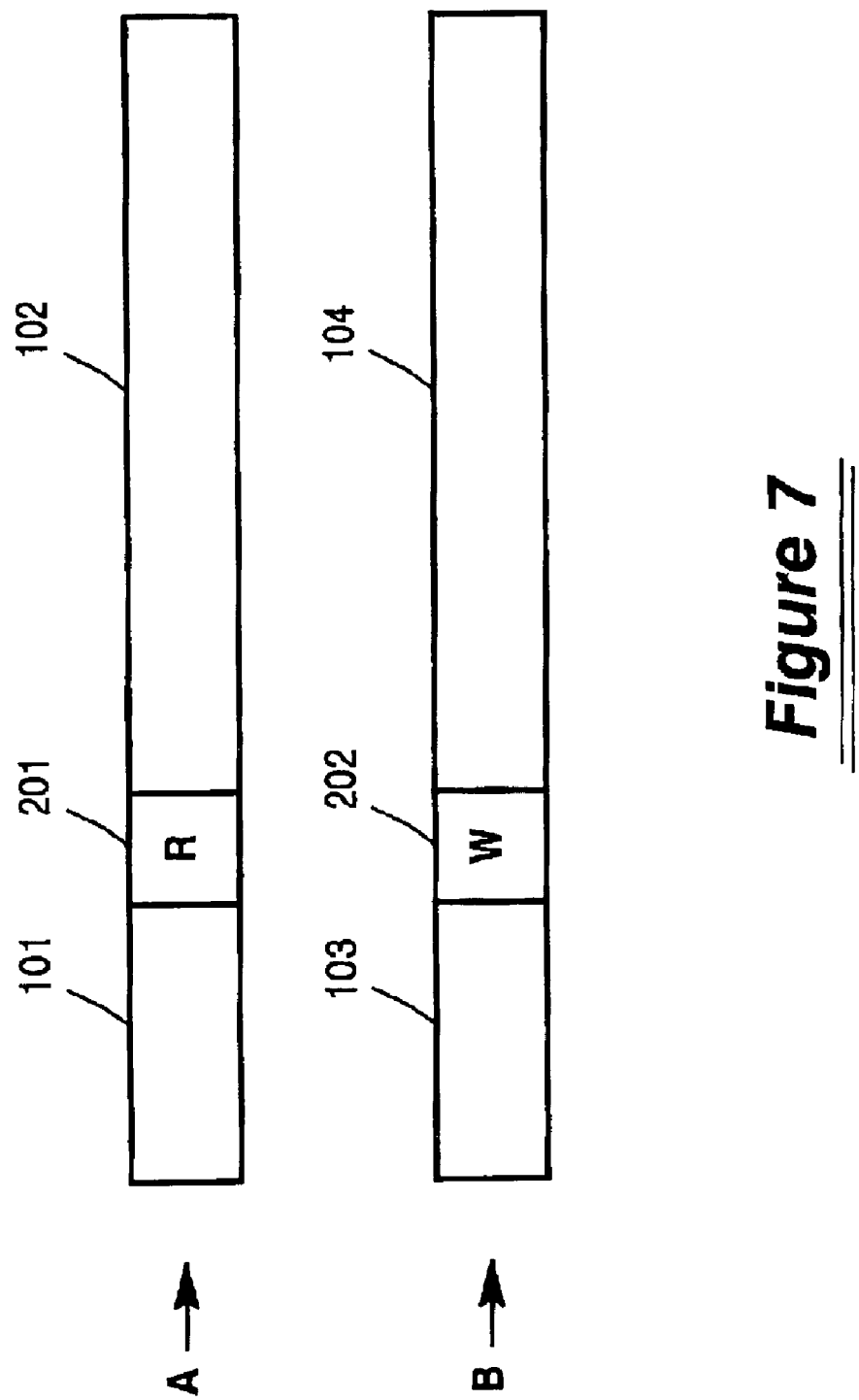

QUEUE BANK REPOSITORY AND METHOD FOR SHARING LIMITED QUEUE BANKS IN MEMORY

This patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates generally to computer systems and processes therein for handling a large set of items with a finite memory resource, and particularly to managing access to said large set of items efficiently and preferably without copying said items.

2. Background Information

"SYSTEM ARCHITECTURE FOR IMPROVED MESSAGE PASSING AND PROCESS SYNCHRONIZATION BETWEEN CONCURRENTLY EXECUTING PROCESSES" (ISSUED Feb. 22, 2000 U.S. Pat. No. 6,029,205) describes a system for coordinated use of messages in a computer system that eliminates the need for copying messages using queues. (This referenced patent application is hereby incorporated hereinto in its entirety by this reference.) That invention works well for ordered lists of messages, either first-in-first-out or last-in-first-out. However, that invention does not solve the problem of how to accomplish its objective in a highly efficient manner so as to avoid the slow process of wading through (physically reviewing) all the entries in a queue to find the unordered data or message of interest. The instant invention, in contrast, has applicability preferably in systems which do not require copying of messages as described in the above-referenced patent, but that can be applied more broadly to any system in which a great many items are in a queue and rapid access to particular items is desirable. In order to set forth the context of this solution, it is useful to first describe several general concepts.

"Processes" are the most widely used unit of computation in computer programming and computer systems. Much of the work of an operating system of a computer is to provide an environment in which application programmers can define processes, execute them, and generally control their behavior. A process is a unit of computation. The action of the unit of computation is described by a set of instructions executed, typically sequentially, on a computer, using a set of data associated with the process. The components of a process are the program to be executed, the data on which the program will execute, resources required by the program (for example, memory), and the status of the execution. For the process to execute, it must have a suitable environment including an engine for executing the program, memory for storing the program and data, and status information indicating the progress of the process. In contemporary computer systems, individual application programs may be implemented as a set of processes. These processes usually must be able to share information and/or synchronize their operation. There are a number of design strategies to allow multiple processes to communicate with one another.

"Banks" are contiguous regions of address space, to which processes may be granted visibility and access by the operating system and hardware. Banks are composed of one or more pages, each of which is a small, contiguous area of storage. The pages comprising a bank need not be physically contiguous to each other. Generally, all pages of a bank share such attributes as accessibility. If a bank is designated to hold a queue or data that can be queued, it may be called a queue bank.

"Queues" are parts of a computer memory, which contain a group of items, each of the items containing some Information of use to at least one process or program. A queue bank may contain a number of queues. Each queue may also be its own bank. Queues are organized as lists, with two ends, which may be called a head and a tail, top and bottom, or front and back. Items may be put onto or retrieved from a queue only from one of these polar ends or the other, and the items are always organized in a sequential list form. Thus items can be organized to provide "First-In-First-Out" (FIFO) access, or Last-In-First-Out (LIFO) access to the items on the list. Accordingly, to get to an item in the middle of the list, one cannot do so without first taking all the items of which are either ahead of the sought-for item, or all those which are behind the sought-for item in the Queue's internally organized list.

It should also be noted that Queues may identify or be an ordered list of queue banks, thus leading to the concept of cascading queues, or queues of queues, or nested queues. A Queue may be composed of a set of queue banks, each one of which in turn may be composed of a queue, which in turn may be composed of a list (or set) of items. We prefer to think of a queue as one queue bank; the items on the queue may also be queue banks with each item queue bank linked in a list of items of the queue. Too, a queue bank may be a single queue of a set of items; or a queue may be composed of a set of queue banks, one of which is just a set of items; and a queue may be composed of a set of queues which in turn are composed of a set of queues which in turn are composed of a set of queue banks which in turn are composed of queues which are in turn each composed of sets of items. Note that an "item" can be an event or a queue bank. It is believed that these few examples sufficiently describe the potential for possible organization of queues and queue banks without being exhaustive.

In the above-referenced and incorporated patent, U.S. Pat. No. 6,029,205, the requirement to pass control over queue items in an organized way between multiple processes was considered, and a solution to that problem described. However, where the number of queues and queue banks is limited, either by available memory space, process constraints, or for other reasons, a solution to a new problem of accomplishing such a result in a limited environment must be found. An additional inherent problem is present where rapid access to the proper queue bank or queue is needed.

These problems become particularly acute in large-scale transaction processing systems particularly, where a single process has access to a limited number of queue banks and also is limited in its time available to get to the item in the queue it needs. However, the solutions described herein may be used in other data processing, computer system, and communications system contexts as the need arises.

The solution should be applicable to multi-processor systems for cooperative processing, and to use in shared memory systems using multiprocessing systems. It should be applicable as well to multiprogramming systems, all without undue experimentation being required, once the concepts presented herein are understood.

A discussion of message-based interprocess communication mechanisms is had in the above referenced U.S. Pat. No.

6,029,205 and is not repeated here; however, it is important to note that such systems are target systems for application of the solution of the instant disclosure. In the referenced patent, messages, whatever they may be or whatever data they may contain, are passed in queue banks. Thus, queue banks may be the message, the queue to which a message queue bank is enqueued, the queue to which a queue containing queue banks is enqueued, or any level of cascading of queue banks in queues.

An important limitation on message passing systems where the sending and receiving processes are prevented concurrent access to the message is the necessity of one or more iterations of copying the message data from one block of memory to another in order to pass the data between processes. This copying is used in some systems to ensure that the receiving process obtains an incorruptible message. Such message passing systems use additional memory and limit overall system performance because of the time and resources used copying message data. The negative impact on performance of the message copy is insignificant for small messages. However, the cost of the message copy grows linearly with the size of the message. Too, the number of messages being copied weighs on the system resources. When the messages passed between processes become very large, such as is the case for large file transfers occurring in file transfer, graphics, and multimedia applications, system throughput suffers. The transfer of such messages, from 10,000 bytes for low-resolution monochrome images to 10,000,000 bytes for high-resolution E-size graphics, places a severe strain on the computer system's ability to provide output to an end-user in a timely fashion. Eliminating the need to copy message data for communication between concurrently executing, cooperating processes while providing adequate message data security such as is provided by U.S. Pat. No. 6,029,205 is important. It is also important that efficient use of limited queues described in the instant document be available for systems in which copies of messages are not made.

Too, when there is a finite resource, such as a limited number of Queue Banks, a system which allocated them would cut off requesting processes from acquiring rights to new Queue Banks since there were no more, and the invention herein provides resolution for this difficulty as well.

BRIEF DESCRIPTION OF THE DRAWINGS

FIG. 7 is a depiction of the instruction apparatus used in the preferred embodiment of the invention to initiate the two queue bank repository management functions: deposit and withdraw.

SUMMARY OF THE INVENTION

Figure 1:
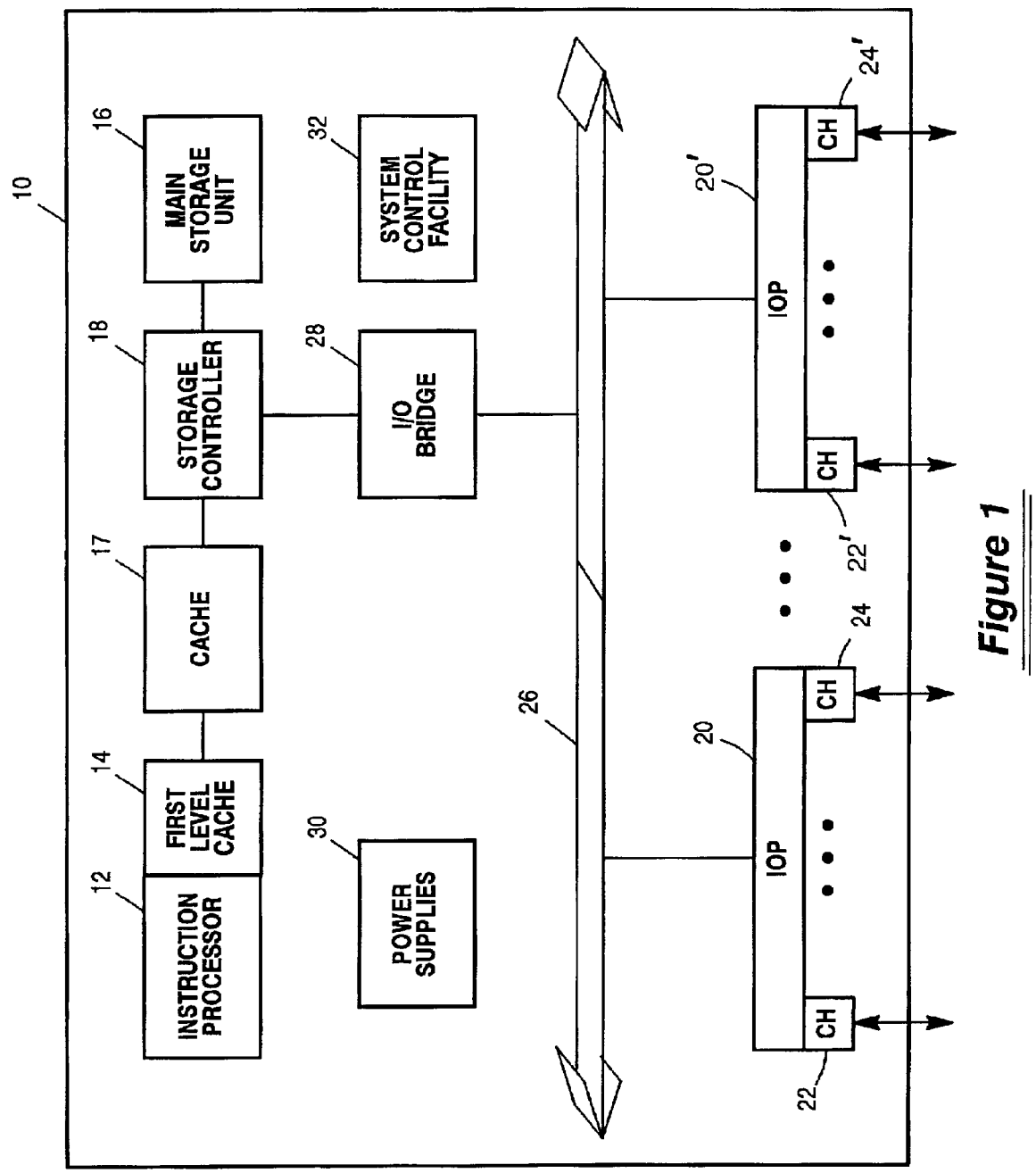
FIG. 1 is a heuristic block diagram of a type of computer system in which the invention can be used.

An architectural element for the organization and use of queues provides a system level facility to store and to find needed queue banks, elements of a queue or other queues, quickly and in the context of a computer system, efficiently. In the preferred embodiment a pair of hardware instructions "deposit" and "Withdraw", are used to manage this architectural element that we call a Queue Bank Repository (QBR). A process "deposits" a queue bank to the QBR, a Queue Bank Repository Manager (QBM) finds a place in the QBR for the queue bank reference from the available portion of the QBR, removes the queue bank from the client process's address space, and returns a token to the process. Later, the process "withdraws" the queue bank by giving the QBM the token, the QBM accesses the queue bank reference associated with the token, returns the place that the queue bank reference occupied in the QBR to the available portion of the QBR, and returns the requested queue bank to the process's address space. The QBR is preferably formed as a group of memory location references which can direct an inquiring process to a needed queue bank immediately in exchange for a token (this is accomplished in the preferred embodiment with a "withdraw" instruction). Or, the QBR can give a token to such a process when the process is seeking to store data regarding the location of a queue bank in the QBR, whereupon the QBR sets a reference to the queue bank identified to the token it has given to the process (this is accomplished in the preferred embodiment with a "deposit" instruction).

A Queue Bank is a unit of storage visibility in the system. In the preferred embodiment, queue banks have the attributes to work with queue bank repositories. It is possible to define or name other "ranges of address space and the data contained in them" to have the similar attributes of passed messages (e.g., serially shared—appears to one process at a time—but not concurrently shared) that can also operate with QBRs as defined in this application.

The term "token" as used throughout this application means a datum that can include, but is not limited to, a pointer, offset, or entry index that permits a QBM to identify the place occupied by the queue bank reference in the QBR.

The QBM means the functionality that keeps track of a deposited queue bank reference, returns a token for the deposited queue bank reference, accepts a token for a withdrawal of a queue bank, returns the associated queue bank to the visible address space of the withdrawing process, manages the available space within the QBR, handles QBR full condition, and handles invalid tokens. In the preferred embodiment, the QBM is the combination of the "deposit" and "withdraw" instructions.

Thus, for example, a process has put some data into a queue bank, but cannot retain control over it for some period of time while it needs to work on some other thing, so it relinquishes the queue bank to the QBR, in exchange for a token. When the process wants to use the data in the queue bank again, it returns the token to the QBR, which returns the queue bank it has stored in exchange for the token.

This provides an improvement over systems which needed to access a queue to find other queues or memory locations for finding data, since it is unnecessary to review each entry in a queue to find out if the sought-after entry is in the queue.

In order to provide a simple analogy, the inventive QBR system works in a manner similar to a coat-check room. A process (like a coat owner wishing to store a coat) needing to store a queue bank for a token in exchange from a queue bank repository management process (the coat-check attendant process) that manages the queue bank repository. The repository manager hands out tokens in whatever order it wishes and cannot hand out tokens when it has no more left in the "basket". When the process which received a token in exchange for storing the queue bank it would need later (or the coat owner) returns the token, the repository manager returns the queue bank to the owner and the token to the basket.

It is most likely that a single process uses the QBR for multiple uses, or for multiple users of the QBR. A single process can have multiple processes within the single process, too, which can all use the QBR. Also, the QBR could be used to pass messages, if desired, among processes.

The QBR is managed through the use of machine-level deposit and withdraw instructions in the preferred embodiment. Such instructions or their equivalent should be executable on any processor, and emulation or software implementation of the instructions is, of course, also acceptable for managing the QBR. The equivalent functions could be implemented in high-level languages although the efficiency of the system would necessarily be reduced. Additional features can be added as desired as well.

DETAILED DESCRIPTION OF THE PREFERRED EMBODIMENTS.

I. Functional Overview of a preferred Queuing Architecture

A Queuing Architecture is implemented in the preferred embodiment as an improvement to the 2200 Series computer systems commercially available from Unisys Corporation, and described in the previously mentioned and incorporated U.S. Pat. No. 6,029,205. While this invention can be used in other systems as will be apparent to one of skill in this art, the preferred embodiment use is in the system for which this invention was first designed and which is described in detail here. FIG. 1 is a block diagram of such a 2200 Series computer system. The Computer System 10 includes one or more Instruction Processors (IPs) 12, each IP having its own First Level Cache 14. The IP executes instructions obtained from the Main Storage Unit 16 via other levels of caches 17 and/or Storage Controller 18. The First Level Cache 14 provides for the acceleration of data and instruction fetches for the IP 12. Although only one Instruction Processor and First Level Cache are shown, multiple Instruction Processors and First Level Caches could be configured. There may be multiple levels of cache. "Higher" levels of cache may be shared. "Lower" levels of cache may be private. The invention described herein may function with any known cache structure. The Main Storage Unit 16 provides the internal mass memory capability for the system. The other levels of cache 17 and Storage Controller 18 control access to the Main Storage Unit and accelerate the data from the Main Storage Unit into the Instruction Processors. Other components of the system include one or more Input/Output Processors (IOPs) 20, 20' each IOP having one or more Channel Interfaces (CH) 22, 24, 22', 24', respectively. The Channel Interfaces may be connected to peripheral devices such as magnetic disk drives, magnetic tape drives, printers, other computer systems, etc. The IOPs 20, 20' interface the I/O channels through an I/O Bus 26 to the I/O Bridge 28. The I/O Bridge 28 is coupled to the Storage Controller 18. (It should be noted that this embodiment hardware is just one of many useable with this invention. The I/O Bridge is not required to be connected to any particular level of cache.) Because of the relative speed differences between the IOP 20, the I/O Bus 26, and the Channel Interfaces 22, 24, one IOP 20 may service multiple Channels, typically eight or sixteen Channels per IOP. Individual Channels contain interface circuitry for each Channel and the connections necessary for Channel cables to peripheral devices (not shown). Power Supplies 30 are provided to supply electrical power to the system. The System Control Facility 32 is a maintenance and system control unit for initializing the system and the reporting of fault conditions. Certainly other designs of computer systems can be employed for use with this invention as will be apparent to one of ordinary skill in these arts; however, the one described is the one currently used.

The preferred embodiment has a set of hardware queuing instructions (which become a part of the instruction set architecture of the 2200 Series computer system) and related Operating System (OS) Executive (Exec) services to provide a protected message passing and process synchronization mechanism. It is contemplated that the present invention may also be implemented in the instruction set architectures and operating systems of other computer systems, or even at higher levels of abstraction by application processes if desired. The U.S. Pat. No. 6,029,205 supports the passing of large binary objects or any other information shared between processes in a shared memory system and uses queues to eliminate the need for data copying between concurrently executing, communicating processes within the computer system. In other systems, copying of messages between processes is required in order to provide adequate protection of the messages passed. ("Messages" are any information passed internal to the system.) When the messages passed between communicating processes are small, the overhead for the message copy is insignificant. If ownership of the message is passed instead, the need to copy the message between subsystems or processes is negated. Additionally, in U.S. Pat. No. 6,029,205 patent's system there is no need to introduce scrubbing or clearing of residual data. It may be noted that queuing has a "security" benefit in that when a message is queued, the originator no longer has access to the data space which it queued. From passers to receivers, serial access by each process is thus guaranteed.

It should be noted that the queuing entity cannot access what it queued. A process has access rights or access privileges to a queue. In the preferred embodiment, when the process enqueues a Queue Bank to a queue, the Queue Bank disappears from the process's address space. If the process has both enqueue and dequeue privileges to the same queue, then the process could enqueue a Queue Bank (make it disappear from its address space) and then dequeue (eventually obtaining the same Queue Bank which was just described as enqueued). When dequeued, the process has made the Queue Bank appear in its address space. Likewise, a process has access to a Queue Bank Repository (or more than one). The types of access a process may have to a QBR would be "no access," "deposit access," and/or "withdraw access" as may be desirable for the particular process). In the common situation, the process will have both deposit and withdraw access because the process will be keeping the QBR for itself. (Of course, variations are available to pass information between processes and so forth.) To reiterate, when a process deposits a queue bank, it gives up visibility to the queue bank, and when it withdraws the queue bank, the process regains (or obtains) visibility of the queue bank; in a manner analogous to the access of a process to enqueued and dequeued queue banks. When withdrawing, the QBR need not put the queue bank into the same process address space that it occupied when the process deposited the queue bank.

In the preferred embodiment, processes communicate with each other in the system by using commonly accessible queues to pass ownership of a queue bank. Thus, the conceptual model for data transfer is pass by reference, not pass by value. A queue client process places entries or events on a queue. A queue server process receives entries or events. An entry contains a message passed between a client and a server over the queue. The message consists of data or control information. The format of the message is not inherent to the Queuing Architecture. Rather, the message complies with the protocol contracted between clients and servers. An event is an indication that a condition known to both the client and server has occurred, but which contains no message. Thus, an event works as a synchronization mechanism between processes.

This architecture reduces the system overhead instruction path length for the context switching of processes by providing an efficient process synchronization mechanism. Instruction path length is the number of instructions (related to processing time) for executing a particular code (or decision) path through a computer program. System overhead instruction path length is the path length attributable to system overhead, not for direct application program use. The instruction path length of a process deactivate/activate sequence using the preferred embodiment of the present invention is less than the equivalent operation using existing process synchronization mechanisms. These savings are realized because the functions performing the context switch are executed in the preferred embodiment system, directly in hardware/microcode rather than by interrupting the operating system software (which in the preferred embodiment is the Unisys Corporation "Exec") for handling, and also by eliminating the need to search through a list of active processes potentially waiting on an event. Further, once the "Exec" (or other operating system) establishes the access rights processes have to queues within their respective domains, no further software checking of rights is needed. However, processes cannot access queues unless granted enqueue or dequeue (or both) rights to the queue. The hardware instruction can check the rights of the executing process for the addressed queue. In the existing communications program used by 2200 Series computer systems, message bunching is used to amortize instruction path length over several messages. The present invention also eliminates the need for message bunching, thereby improving message latency time in systems and situations that may otherwise require message bunching. This advantage is important for application program environments where the response time requirements are measured at machine speeds (e.g., a few milliseconds for a file transfer).

To reiterate, when a message is enqueued, the message is removed from the client process's visibility. This prevents the client process from overwriting the message, thereby providing the server process with a secure message. Hardware access checks, which may use a standard lock and key mechanism, are preferably employed to prevent unauthorized access to the queues. This provides message protection within this architecture.

The invention described in U.S. Pat. No. 6,029,205 cited above, defines four new instructions for hardware support of message passing and process synchronization. These instructions encompass the actions of placing an entry or event on the head or tail of a queue, receiving an entry or event from a queue, and forcing a process deactivation to wait for an entry or event. The Enqueue instruction either adds an entry to the tail of a queue, or, if so specified for a queue, adds an entry to the head of a queue, or, if so specified by the programmer, places an event on a queue. The Enqueue to Front instruction either adds an entry to the head of a queue, or, if so specified by the programmer, places an event on a queue. The Dequeue instruction removes an entry from the head of a queue, if one exists. The Dequeue Or Wait instruction either removes the entry from the head of a queue, if one exists, or detects that an event has been placed on the queue, or if the queue is empty (i.e., it has no entries or events), causes the active process executing the instruction to deactivate until an entry or event is placed on the queue. Therefore, in order to access any information through this queuing architecture, one must, without the invention described in the instant document, Dequeue through an entire queue until the information sought is found. Many other computer architectures require similar processing and can be similarly enhanced by use of this invention.

A. Basic Queue Structure

Figure 2:
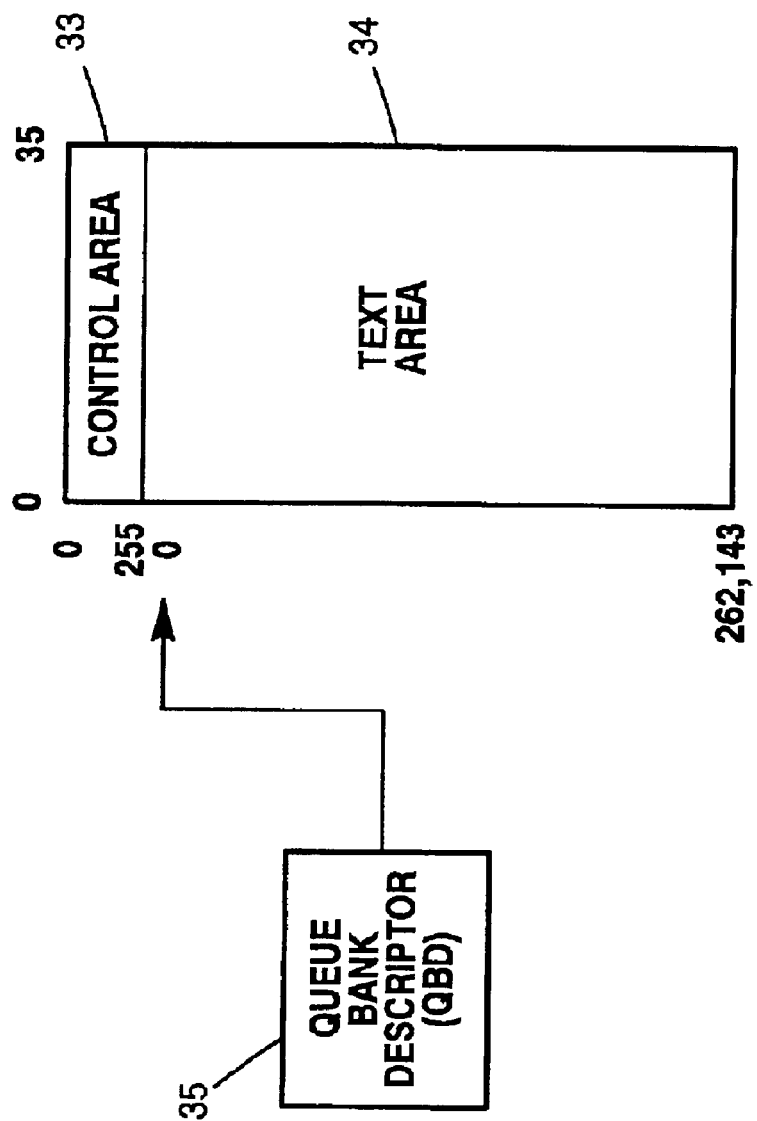
FIG. 2 is a block diagram of a queue bank.

A Queue is the conceptual model used by the invention described in the above-referenced U.S. Pat. No. 6,029,205 patent and which can be used in other computer systems to attain improved message passing and faster process synchronization between processes. A Queue in the preferred embodiment consists of one Queue Header and zero or more Queue Entries. The object making up each element in the Queue is called a Queue Bank. A Queue Bank is a unit of storage visibility in the system. Queue Banks are units of storage visibility used as either Queue Headers, Queue Entries, or both. Queue Banks preferably reside in some memory like Main Storage Unit 16. A Queue Bank is comprised of two parts, a Control Area for control information, and a Text Area for message data. A Queue Bank is referenced and described by a Queue Bank Descriptor (QBD). FIG. 2 is a diagram of the format of a Queue Bank. In the preferred embodiment, the Queue Bank contains a protected 256-word Control Area 33, which contains the queue links and various queue controls, and a 1- to 262,144-word Text Area 34, used to hold data specific to the queuing protocol used. The size of these fields are chosen because they are employed with the preferred embodiment, but clearly, different to sized fields would be appropriate for different computer systems with which this invention can be used. The number of words in the Text Area used is dependent on the size of the data being passed in the message. This size is preferably specified by an Upper Limit field in data for handling the message. A Queue Bank Descriptor (QBD) 35 is used to describe a Queue Bank. A Bank Descriptor is a basic storage structure used for managing the address space in a computer system, but any virtual address organization would be acceptable for use with the invention. Thus, in the preferred embodiment, the virtual address is a 36-bit word identifying the name of a bank in which the address lies and the position of the address within the bank. (Using any virtual address system the address would identify where the Queue Bank is located.) A bank name could be used to identify the Bank Descriptor that describes the bank.

Figure 3:
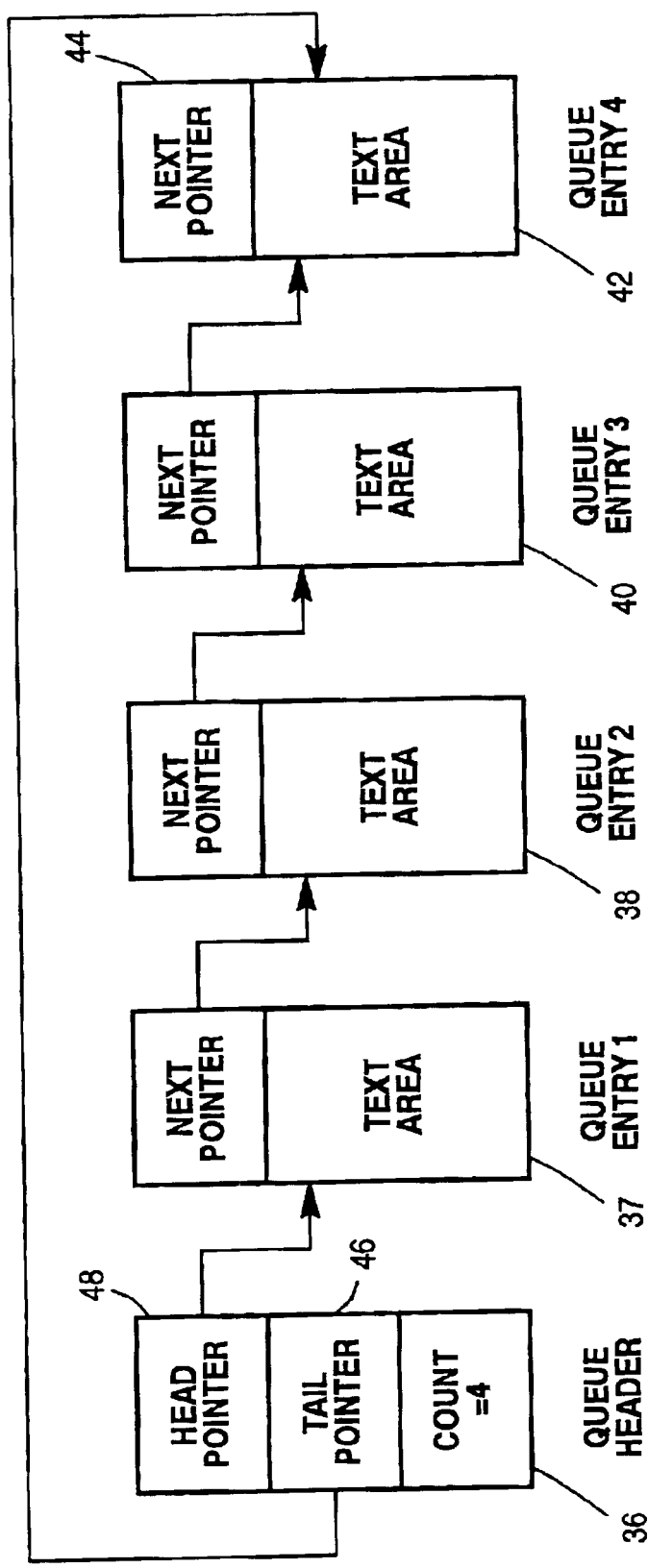
FIG. 3 is a block diagram of a queue.

For each queue, one Queue Bank acts as the Queue Header. In the Queue Header, a Head Pointer and a Tail Pointer address the head and tail Queue Entries respectively. A Count is included in the Queue Header which stores the number of Queue Entries currently enqueued. In each Queue Entry, a Next Pointer points to the next Queue Entry in the Queue. In some situations, the contents of the Next Pointer, Head Pointer, and Tail Pointer may be architecturally undefined. FIG. 3 is a diagram illustrating a sample Queue. The Queue Header 36 describes a Queue with four Queue Entries labeled 37, 38, 40, and 42, respectively. Execution of an Enqueue instruction to this Queue Header 36 will add a Queue Entry to the tail of the Queue (unless a forced Enqueue to the head of the queue is indicated in the Queue Header). The new Queue Entry (not shown) will be pointed to by the Next Pointer 44 of Queue Entry 4 42, and by the Tail Pointer 46 of the Queue Header 36. Execution of a Dequeue instruction based on this Queue Header 36 will retrieve Queue Entry 1 37, redirecting the Queue Header's Head Pointer 48 to point to Queue Entry 2 38. Execution of another Dequeue instruction will retrieve Queue Entry 2 38, and so on.

B. Hierarchical Queuing

Figure 4:
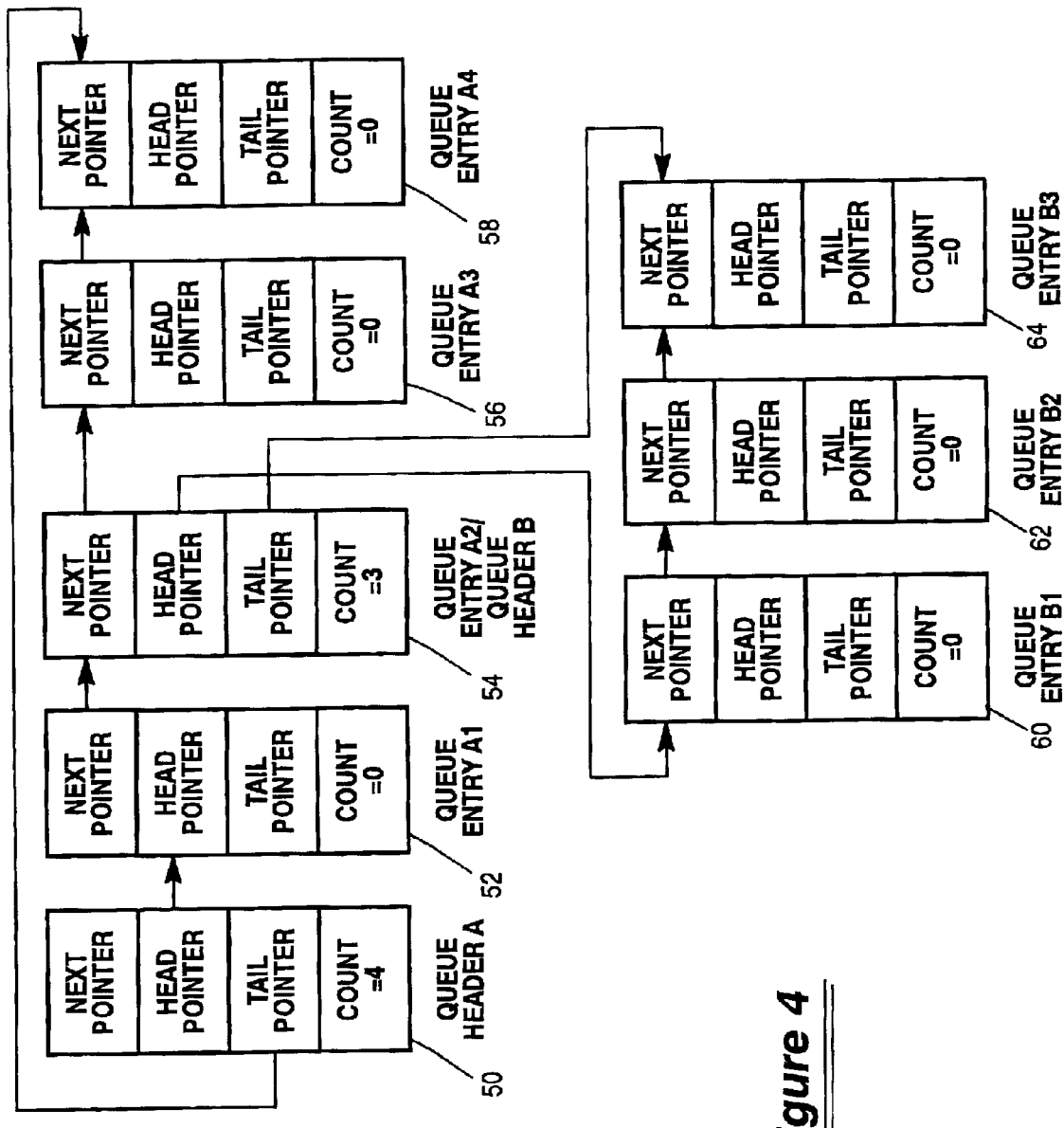
FIG. 4 is a block diagram of a nested queue.

To accommodate messages larger than can be placed in a single Queue Bank and certain order-critical protocols, the Queuing Architecture supports hierarchical queuing. With hierarchical queuing, one queue can be enqueued and dequeued as a single entity on another queue. To support hierarchical queuing, all fields relevant to both Queue Headers and Queue Entries are included in all Queue Banks. FIG. 4 is a diagram illustrating the concept of hierarchical queuing. In the example shown in FIG. 4, there are two Queues. Queue A, defined by Queue Header A 50, has four enqueued Queue Entries, A1 through A4, labeled 52, 54, 56, and 58, respectively. Queue B, defined by Queue Header B 54, has three enqueued Queue Entries, B1 through B3, labeled 60, 62, and 64, respectively. Queue Header B 54 is also Queue Entry A2 54 on Queue A. Queue B is enqueued to Queue A by executing an Enqueue instruction with a Queue Entry of Queue Header B and a Queue Header of Queue Header A.

II. Queue Bank Repositories and their use.

Figure 5A:
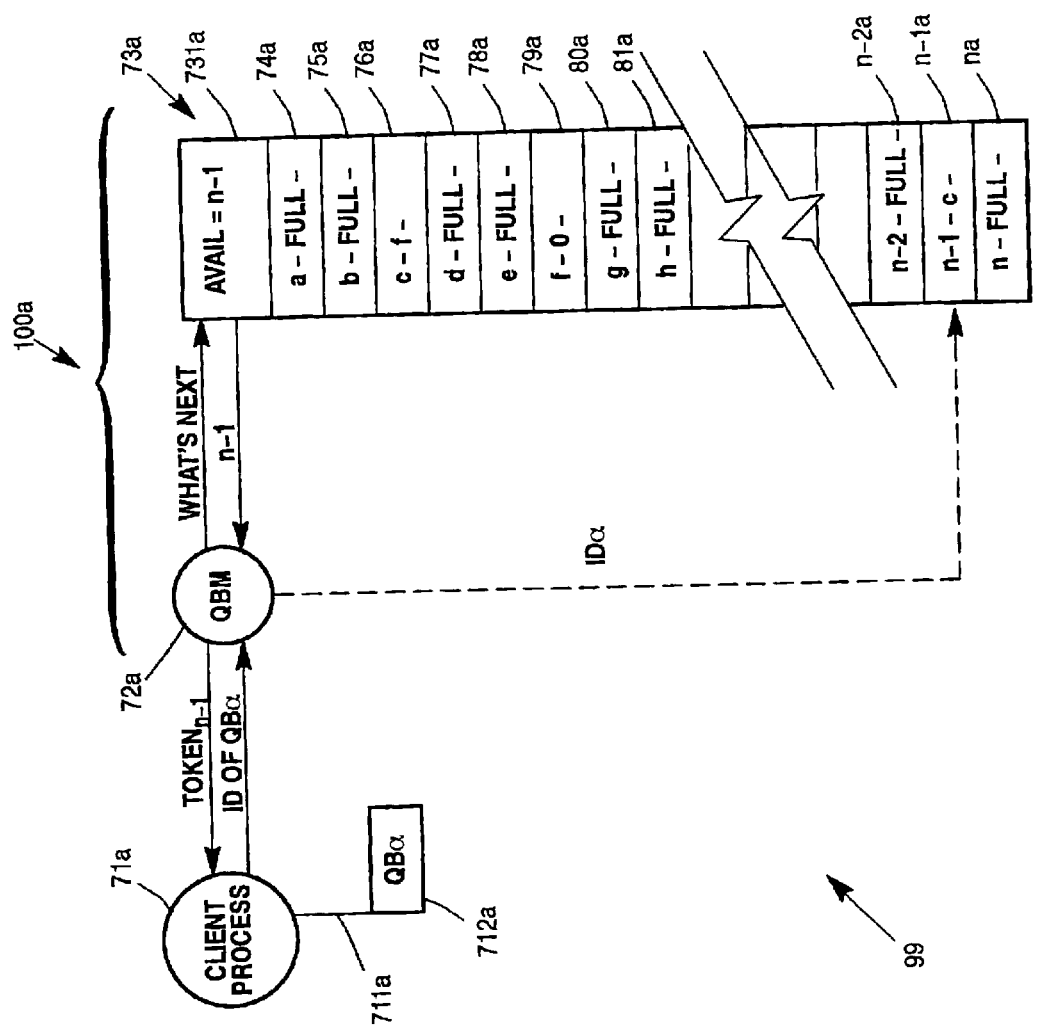
FIGS. 5A, 5B and 5C are block diagrams of process states wherein a client process is operating together with a queue bank repository in accordance with the invention.
Figure 5B:
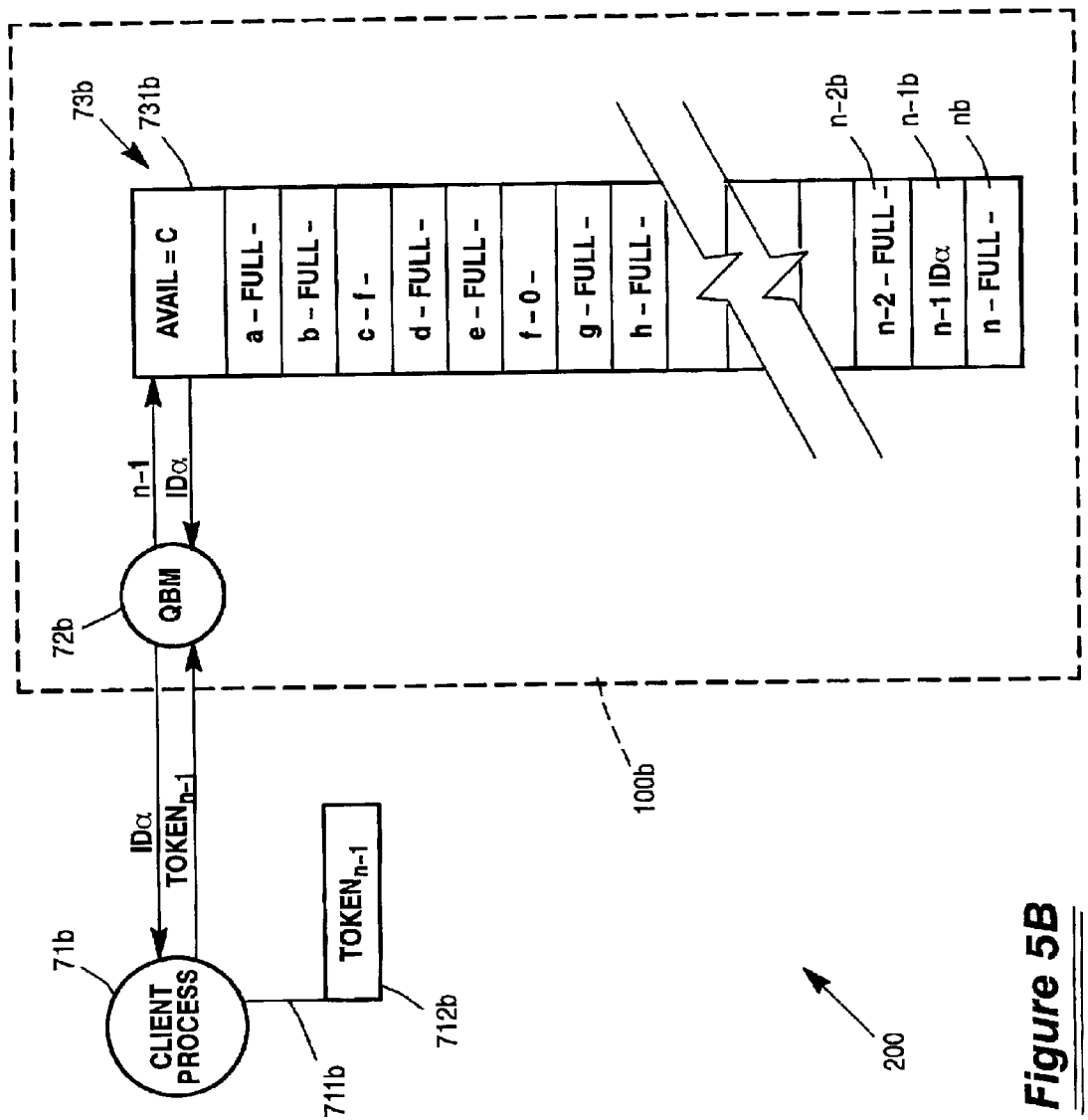
Figure 5C:
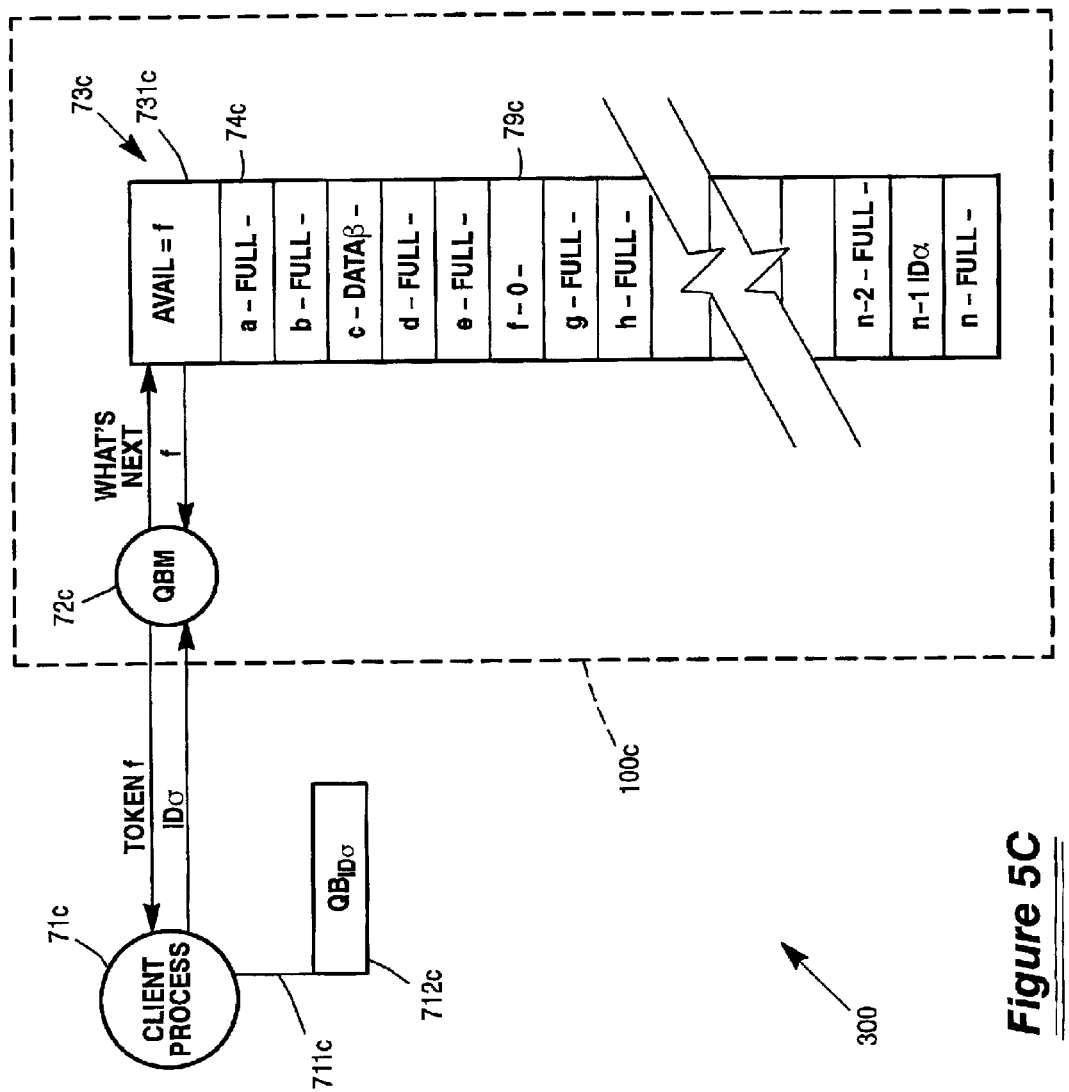

An illustration of the typical functioning of the QBR is found in FIGS. 5A–C, wherein the client process 7a–c interacts with a queue bank repository manager (QBM) 72a–c by passing tokens and queue banks back and forth between them.

In the preferred embodiment, the QBM is actually the operation of two hardware level instructions, deposit and withdraw. These instructions are illustrated briefly in FIG. 7 as instructions A and B respectively, showing that a very small portion of the instruction 201 and 202 are required to indicate whether the instruction is a deposit or a withdraw instruction. The rest of the instruction 102 or 104 would Indicate which QBR and either the queue bank or token. The first part of the instruction words 101 and 103 preferably indicate what class of instruction this deposit A or withdraw B is. The deposit instruction allows the executing process to place a specified queue bank into the repository, receiving a token in exchange. The queue bank is removed from the address space of the executing process as part of this operation, thereby allowing use of that portion of the address space for other program purposes. The token returned by the deposit instruction may be utilized subsequently by the withdraw instruction, which uses the token to retrieve the previously deposited queue bank from the repository, and restores it to the address space of the executing process, not necessarily in the same location from which it was deposited. Software processes can clearly handle this function as one of ordinary skill can show without undue experimentation upon review of the concepts here within.

The QBM is responsible for also transferring tokens or queue banks from the header 731a–c of the QBR 73a–c and for being able to read from the header 731a–c which queue bank repository entry within the QBR is available next. (The QBR 100a–c is illustrated as formed of the two components QBM and QBR for convenience, and it is understood that software and/or hardware architects may employ these concepts in forms that appear superficially different but which contain the characteristics described and taught herein).

Generally, the QBR can be described as any set of available entries, implemented as a linked list in the preferred embodiment. Also, entries that are in use (by a process) are not in the set of available entries of the QBR. Thus, in the preferred embodiment when the deposit instruction operates, it removes an entry from the set of available entries and fills it with a reference to a queue bank which the process surrenders. Similarly, when a process submits a token, the withdraw instruction operates to restore visibility, in the address space of the executing process, to the queue bank represented by the surrendered token (a reference to which in the preferred embodiment will be found in section 104 of the heuristic instruction word B of FIG. 7). The withdraw instruction also makes that token available again in the set of available entries. (Thus, one of ordinary skill in this art will recognize that with respect to the preferred embodiment, a QBM is a heuristic function, being merely the operation of these two hardware instructions. Nevertheless, the use of such a function is important to describe the operation of the invention appropriately for alternative embodiments.)

In one preferred embodiment, before a process can issue deposits or withdrawals, the process is either granted access to QBRs established by other processes or requests of the Exec (a name for the operating system) to build a QBR with appropriate access to the QBR. The operating system generates an address space asset for that process to use as its QBR and thus keep the space available for the linked list which will develop. If the asset is filled, that is, no further space is available for references to queue banks which the process will need, the operation of the deposit instruction notifies the Exec via an interrupt. The Exec may determine that the process has failed, or the Exec may allocate more space to the QBR and allow the process's deposit instruction to restart.

An example procedure with reference to these FIGS. 5A–C follows.

Again, the typical situation would avail a client process of an indentured QBR, which is illustrated here, but one could have a plurality or multiplicity of client processes employing a single shared QBR if desired, with priority schemes and similar overlays also finding use in such situations. However, here we show the preferred embodiment usage with a single client process and a single QBR.

The Client process 71a in state 100 of FIG. 5A (deposit operation) has a reference 711a to a queue bank (QB α) 712a which it needs to relinquish control of, temporarily or permanently (so another process may access it for example, or because it needs to do something similar to another queue bank that it will do to this one later, or another example). The client process 71a communicates with its QBR through a QBM 72a, requesting a token and relinquishing the queue bank 712a to control of the QBM. The QBM checks the header 73a of the QBR 731a and determines that the address n–1(a) is available to store the queue bank reference. Accordingly, it transfers the queue bank reference to that address. At that time it takes the indication of the next available address, here "c" from n–1(a) and places it into the header, now shown in FIG. 5B as 731b.

In state 200, illustrated in FIG. 5B (withdraw operation), the client process 71b submits the token n–1 712b to the QBM 72b when it wants to restore visibility to the queue bank it stored in the QBR. It is possible that (in other non-illustrated embodiments) some other process may have given process 71b the token n–1 to retrieve the queue bank from the QBR, but again, the preferred embodiment assumes that multiple processes may use a single QBR but they do not usually use the QBR to pass queue banks among the multiple processes. Each process, typically, will deposit its queue bank in the QBR and then withdraw its own queue bank from the QBR.

It may be noted that the reference 711a is similar to the reference 711b, but the client process can manage control over queue banks and tokens howsoever is convenient in the embodiment being designed by a reader of this document.

In FIG. 5C (deposit operation), state 300 illustrates the exchange of the queue bank 712c supplied by the client process 71c for a token supplied by the QBM 72c. The QBM determines the token to return by examining the header 731c of the QBR 73c, which indicates that the first available location 79c is at "f". The QBM computes the appropriate token for location "f", updates the header with the next available slot pointed to from location "f", and stores a reference to the queue bank 712c in location "f". FIG. 5C is here to illustrate the endpoint of usage for the QBR, because at location "f" 79c there is a zero (0) stored, indicating in the preferred embodiment, that there is no other available address after "f" which can be used. Consequently, after filling f with queue bank reference σ 712c, the QBM will no longer accept queue banks because it will have no tokens to deliver in response to requests.

This situation can be handled in various ways. The system can generate a new QBR and assign it to the client, expand the existing QBR, or it can simply force the client to wait. Refer to the description of use of instructions for the QBM above for more detail regarding how this could be accomplished.

The situation not described here may be one in which a bad token is held by a process. In other words, one which does not match the allocated space for a Queue Bank Repository or one which is otherwise defective. Also, situations may exist where the QBM fails to return a token or queue bank. All such situations should be treated as errors and the operating system should handle them in accordance with normal error processing. The process should also have error handling routines to handle this kind of situation.

III. Application Example.

Example: Assume a number of processes request the transmittal of 6 messages across a communication network by enqueuing the messages to the communications process's outbound queue. Message 1 is directed to destination B, Message 2 is directed to Destination C, Message 3 is directed to Destination A, Message 4 is directed to Destination D, and Message 5 is directed to Destination C. The communications process sends the 6 messages. It must now await response from each destination for each (group of) messages sent to the particular destination. The communications process is awaiting a response or time-out from the transmission. If the receiver acknowledges the message, the communications process may delete that message. If the receiver requests a retransmission of the message, the communications process can re-transmit the message. The communications process has "sent" each message, but it has not completely handled each message. The communications process needs to hold these sent messages somewhere. The communications process cannot predict Which Destination is going to respond next. The communications process would like to be able to retrieve the messages in any order. In this example, the communications process can put each sent message in a "waiting response" Queue Bank Repository. It stores the received token for each message in a list associated with each destination that owes a response. When a destination responds, with an acknowledgement for instance, the communications processor can retrieve the token associated with the destination, execute a Withdraw from the "waiting response" QBR using the token for that destination. When the instruction provides the associated queue bank of the message, the communications process can delete that message. If the destination responded with a retransmit request, the communications process can use the token to retrieve the associated queue bank of the message in the same way but after retrieving, re-transmit the request instead of deleting it.

Summary Table of Differences Between QBRs and Queuing

| FEATURE DESCRIPTION | QUEUING | REPOSITORIES |
|---|---|---|
| ITEM ADDED/ REMOVED | QUEUE BANK | QUEUE BANK |
| ORDER | FIFO OR LIFO | UNORDERED (any slot) |
| SHARABLE | USUALLY SHARED | USUALLY PRIVATE |
| REMOVAL INFORMATION | CONTAINS QUEUE HEADER | REPOSITORY ID (token) |
| ACCESS | QUEUE BANK HEADER: ENQUEUE DEQUEUE | REPOSITORY: DEPOSIT/WITHDRAW ONLY |
| INTERNAL LINKAGE | HIDDEN AREA IN FRONT OF QUEUE BANK USED FOR LINKING | REPOSITORY IS THE LINKAGE - LINKAGE IS ONLY FOR AVAILABLE ENTRIES - ENTRIES IN USE (preferably) HAVE NO LINKAGE Internal structure of QBR is hidden from process using the QBR |
| POSSIBLE NUMBER OF ITEMS | UNLIMITED (very large) CASCADING: QUEUES OF QUEUES OF QUEUES OF . . . | FIXED NUMBER (large) FIXED (can contain cascaded items) |

IV. Preferred Embodiment Inventive Process Described Stepwise.

Figure 6:
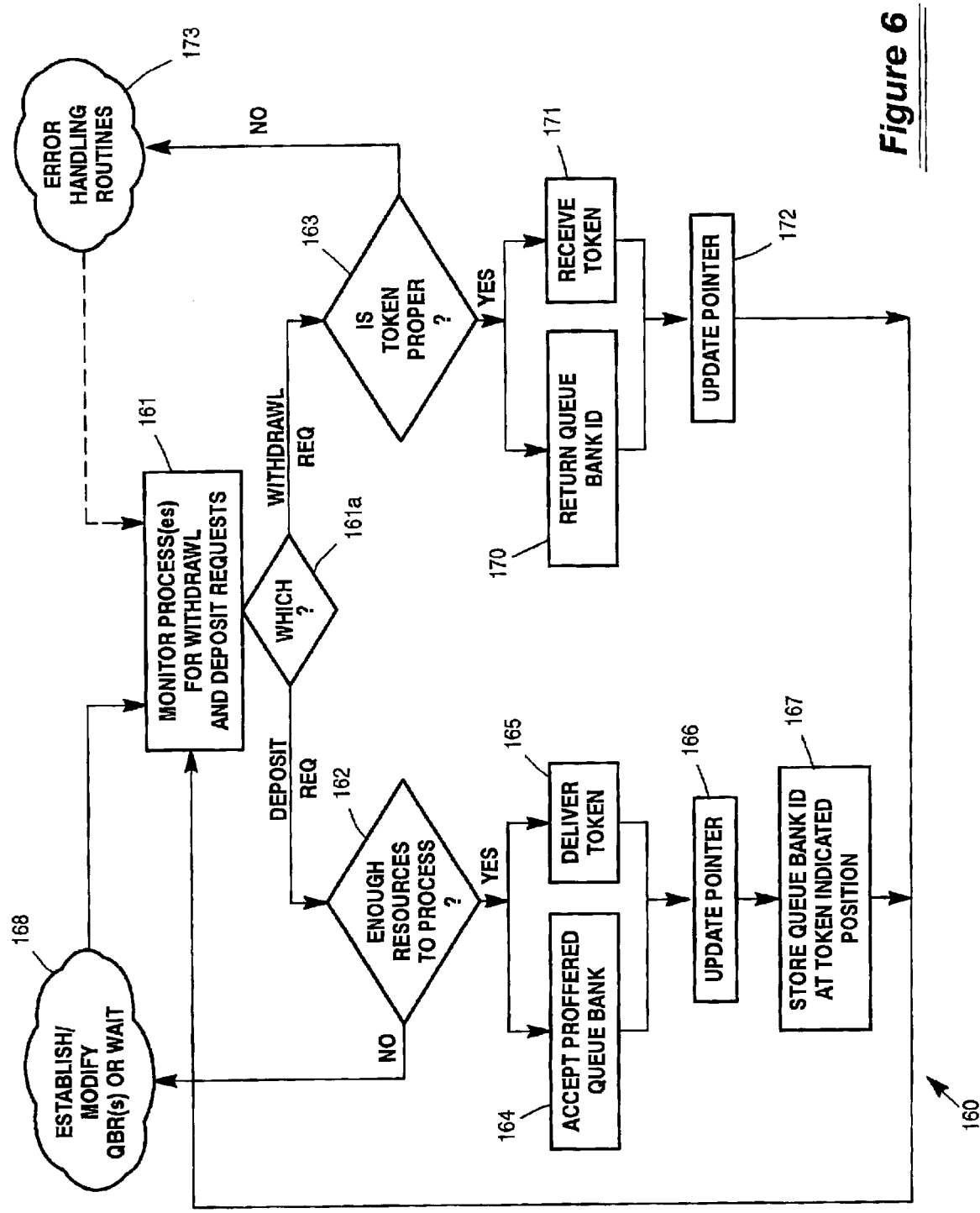
FIG. 6 is a flow chart of the process of a preferred embodiment of the invention.

Refer now to FIG. 6 in which a flow chart 160 of a preferred embodiment of the invention is illustrated. First, refer to step 161 wherein a computer system having a queue bank repository QBR running is waiting to receive requests for deposit or withdraw. The QBR mechanism first determines 161a, based on the instruction executed by the requesting process, whether it is handling a deposit or withdraw request. If it is a deposit request, the next thing to be determined 162 is whether there are enough resources available to store, in the QBR, the reference to the proffered queue bank. Typically, a preferred embodiment QBR has on the order of $2^{30}$ tokens available and can handle any process requests for storage. However, should a process reach the end of the repository's space for storage of queue bank references, then ways can be created to work around that, or the process can simply wait for a token (and corresponding space) to become available. Readers may create much smaller QBRs than are commonly used by the inventors and this situation may be common in such environments. (It should be noted that in the preferred embodiments a QBR always has space to retain the whole queue bank reference as it requires only one entry in the QBR.)

If the QBR has insufficient space, that is, no available entries, a routine should be initiated 168 to logically extend the QBR, or to wait, if that is preferred. The routine preferably will be an operating system (Exec) feature, although if, when the QBR is initially set up, it is created with expansion capacity, a deposit instruction could be used to automatically add available entries (by reallocating memory space available to extend the QBR space). To accommodate QBRs with varying capacity, the tokens should be of sufficient size to uniquely identify all of the initially set up entry space and any potential expansion areas of the QBR.

It should be clear that a token value uniquely identifies an entry in the queue bank repository.

In order to obtain adequate performance of the QBR mechanism, conversion of a token to and from its corresponding entry location must be a high-speed operation. In the preferred embodiment, the token is derived from the entry location relative to the QBR header. Other embodiments could use other mechanisms, such as a hash table lookup, as will be apparent to one skilled in this art.

If there is an available entry in the QBR, the proffered queue bank deposit is accepted and placed 164 into the available entry and the client process receives 165 a token identifying the entry. (It should be noted that the steps 164 and 165 are order independent, which is why they are illustrated as shown. Either one could precede the other as may be convenient.) The QBR header is updated 166 with the location of the next available entry. In the preferred embodiment, the available entries are kept in a linked list, so that the entry corresponding to the token being delivered contains the location of the next available entry, which may be zero, indicating there are insufficient resources to process additional requests. The QBM should complete the storage of the proffered queue bank reference 167 at the token indicated entry. Then the computer system can again wait 161 for further withdraw and deposit requests.

On receipt 161/161a of a withdraw request, the identity of or information in the token is scrutinized 163. If the token is valid, the queue bank reference stored in the entry associated with that token is returned 170, the returned queue bank is made visible in the client's address space and the token received 171. The pointer to the newly available entry is now updated 172, preferably by placing the last available entry location or pointer into the newly available entry. (The newly available entry is created by the return of the queue bank from the entry identified by the token). Then control is shifted back to monitoring in step 161 again, for new requests for deposit and withdraw. (It should be noted that the steps 170 and 171 are order independent, which is why they are illustrated as shown. Either one could precede the other as may be convenient.)

If, in step 163, it was determined that the token was improper, error handing routines should be called and employed 173. The error handling routines may close down (disallow process) use of a QBR if desirable in the particular implementation. A token can be found to be improper because it is not within a valid range, because an indicated entry does not have a valid queue bank reference, or because the QBR is not functioning.

V. Conclusion.

What is taught is a new way to provide the capacity to offload data resources from the management responsibility of software entities, which are called clients, that do not tie up significant computer resources and enables transfer of control over memory without copying data.

The invention is described in detail above and is only limited in scope by the following appended claims.

What is claimed is:

1. In a computer system having identifiable memory address spaces which may be allocated to client processes, a queue bank repository system for facilitating control of such address spaces to such client processes comprising:

a repository of said memory address spaces wherein each memory address space within said repository may be called an entry and each said entry contains a value which can be either an end-of-repository space indicator or a current value which indicates a next available entry, or said entry may contain a queue bank descriptor, and wherein said repository has a header memory value which is either a one of said current values or said end-of-repository space indicator, a manager of said repository comprising
    a functionality for generating a token wherein said token contains an indication of said header memory value and for passing said token to a client process if said client process passes or attempts to pass a queue bank descriptor to said manager for storage into one of said memory address spaces of said repository,
    a functionality for storing said queue bank descriptor from said client process into a one of said memory address spaces indicated by said header memory value,
    and wherein said manager further comprises a functionality for retrieving any requested queue bank descriptor from said queue bank repository upon receipt of tendered a token from any client process which has previously received said token, directly or indirectly, from said functionality for generating a token, and for sending said queue bank descriptor to said tendering client process to enable said tendering client process to retrieve a queue bank descriptor corresponding to said randomly requested queue bank descriptor, said functionality for retrieving any requested queue bank descriptor further comprising a functionality for placing the header for the next available entry into the returned entry from which said queue bank descriptor had been retrieved responsive to said tendered token and which functionality is also for putting the address of the returned entry into the next available entry.

2. The queue bank repository system of claim 1 wherein said functionality for generating a token is an instruction and wherein said functionality for storing said queue bank descriptor from said client process into a one of said memory address spaces indicated by said header memory value is also an instruction.

3. The queue bank repository system of claim 1 wherein said manager further comprises a functionality for reading a value in said one of said memory address spaces indicated by said header value and storing said value into said header prior to or contemporaneously with storing said queue bank descriptor from said client process into said one of said memory address spaces indicated by said current value so that following said storing, said current value shall contain a value that was in said one of said memory address spaces.

4. The queue bank repository system of claim 1 wherein said functionality for reading further comprises a functionality for clearing said value from said one of said memory address spaces while storing said value into said header current value.

5. The queue bank repository system of claim 1 wherein said manager further comprises a functionality for reading a value in said one of said memory address spaces indicated by said header value and if said header value is said end-of-repository value, comprising a functionality for generating a status indicating the repository is full.

6. The queue bank repository system of claim 1 wherein said manager further comprises a functionality for reading a value in said one of said memory address spaces indicated by said header value and if said header value is said end-of-repository value, comprising a functionality for calling an operating system to cause said operating system to allocate a new space to add to said repository and for returning a value indicative of the address of the entry in said new space wherein queue bank descriptors can be stored by a client process.

7. The queue bank repository system of claim 1 wherein said repository of said memory address spaces has more than one set of said memory address spaces and uses only a portion of those of said more than one sets as said memory address space within said repository unless said portion becomes fully occupied and in such event, upon said client process attempting to pass or passing a queue bank descriptor to said manager for storage to said portion when said portion is fully occupied, a functionality extends said memory address space within said repository to include another one of said one set of said memory address spaces to said memory address space.

8. The queue bank repository system of claim 1 wherein said token is available in a plurality of different formats as determined by the specific implementation and wherein said formats include, but are not limited to, pointer, offset, and entry index.

9. The queue bank repository system of claim 1 wherein said tokens within the repository each have a size to hold any queue bank descriptor that could be generated on the system.

* * * * *